(12) United States Patent
Fan et al.

(10) Patent No.: US 12,375,120 B2
(45) Date of Patent: Jul. 29, 2025

(54) DEVICE OF PROCESSING DATA, OFFICE DEVICE, OFFICE METHOD, OFFICE APPARATUS, MEDIUM AND PRODUCT

(71) Applicants: Beijing BOE Technology Development Co., Ltd., Beijing (CN); BOE Technology Group Co., Ltd., Beijing (CN)

(72) Inventors: Xichao Fan, Beijing (CN); Yazhou Ren, Beijing (CN); Biqi Li, Beijing (CN); Zhipeng Lu, Beijing (CN); Feng Qu, Beijing (CN); Yali Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/262,219

(22) PCT Filed: Aug. 24, 2022

(86) PCT No.: PCT/CN2022/114409
§ 371 (c)(1),
(2) Date: Jul. 20, 2023

(87) PCT Pub. No.: WO2024/040451
PCT Pub. Date: Feb. 29, 2024

(65) Prior Publication Data
US 2024/0187032 A1  Jun. 6, 2024

(51) Int. Cl.
*H04B 1/40* (2015.01)
*G06K 19/077* (2006.01)
*H04B 1/04* (2006.01)

(52) U.S. Cl.
CPC ......... *H04B 1/40* (2013.01); *G06K 19/07773* (2013.01); *H04B 1/0475* (2013.01); *H04B 2001/0425* (2013.01)

(58) Field of Classification Search
CPC ............... H04B 1/40; H04B 1/0475; H04B 2001/0425; H04B 1/38; G06K 19/07773
See application file for complete search history.

(56) References Cited

U.S. PATENT DOCUMENTS 11,627,205 B2    4/2023  Sun
2022/0069848 A1  3/2022  Han et al.
(Continued)

FOREIGN PATENT DOCUMENTS

CN    103747521 A    4/2014
CN    205847265 U    12/2016
(Continued)

*Primary Examiner* — Sisay Yacob
(74) *Attorney, Agent, or Firm* — Westman, Champlin & Koehler, P.A.

(57) ABSTRACT

The device of processing data based on the radio frequency identification includes: a receiving antenna used to receive a first radio frequency signal; a first front-end module electrically connected to the receiving antenna, wherein the first front-end module is used to receive and amplify the first radio frequency signal; a first radio frequency integrated circuit electrically connected to the first front-end module, wherein the first radio frequency integrated circuit is used to demodulate the amplified first radio frequency signal sent by the first front-end module to obtain a first baseband signal; and a baseband chip electrically connected to the first radio frequency integrated circuit, wherein the baseband chip is used to receive the first baseband signal, decode the first baseband signal, and output a data processing result. The present disclosure further provides an office device, an office method, an office apparatus, a storage medium and a program product.

18 Claims, 6 Drawing Sheets

100b

(56) References Cited

U.S. PATENT DOCUMENTS

| | | | |
|---|---|---|---|
| 2022/0166849 A1 | 5/2022 | Sun | |
| 2023/0238994 A1* | 7/2023 | Lin | H04B 1/0078 |
| | | | 455/552.1 |
| 2023/0361802 A1* | 11/2023 | Thakur | H04B 1/44 |

FOREIGN PATENT DOCUMENTS

| CN | 106339857 A | 1/2017 |
|---|---|---|
| CN | 107347094 A | 11/2017 |
| CN | 108768561 A | 11/2018 |
| CN | 111695417 A | 9/2020 |
| CN | 112492580 A | 3/2021 |
| CN | 113159470 A | 7/2021 |
| CN | 114168244 A | 3/2022 |
| CN | 114786168 A | 7/2022 |

\* cited by examiner

DEVICE OF PROCESSING DATA, OFFICE DEVICE, OFFICE METHOD, OFFICE APPARATUS, MEDIUM AND PRODUCT

CROSS-REFERENCE TO RELATED APPLICATION

This application is a Section 371 National Stage Application of International Application No. PCT/CN2022/114409, filed on Aug. 24, 2022, entitled "DEVICE OF PROCESSING DATA, OFFICE DEVICE, OFFICE METHOD, OFFICE APPARATUS, MEDIUM AND PRODUCT", the content of which is hereby incorporated by reference in its entirety.

TECHNICAL FIELD

The present disclosure relates to a field of a computer technology, and in particular, to a device of processing data based on a radio frequency identification, an office device, an office method, an office apparatus, a storage medium and a computer product.

BACKGROUND

With an advent of the Internet of Everything era, a future wireless communication system may accommodate about 100 billion terminal devices. An enterprise office device serves as a hardware facility of an office communication system. An office efficiency of the office device may affect an economic benefit of an enterprise. In the face of increasing number of terminal devices and continuously upgrading office communication systems, the office device may not only need to provide a safe office environment, but also need to have a usability and an extendibility.

SUMMARY

The present disclosure provides a device of processing data based on a radio frequency identification, an office device, an office method, an office apparatus, a storage medium and a computer product.

According to a first aspect, the present disclosure provides a device of processing data based on a radio frequency identification, including: a receiving antenna configured to receive a first radio frequency signal: a first front-end module electrically connected to the receiving antenna, wherein the first front-end module is configured to receive and amplify the first radio frequency signal: a first radio frequency integrated circuit electrically connected to the first front-end module, wherein the first radio frequency integrated circuit is configured to demodulate the amplified first radio frequency signal sent by the first front-end module to obtain a first baseband signal: and a baseband chip electrically connected to the first radio frequency integrated circuit, wherein the baseband chip is configured to receive the first baseband signal, decode the first baseband signal, and output a data processing result.

For example, the first front-end module includes: a first low-noise amplifier electrically connected to the receiving antenna, wherein the first low-noise amplifier is configured to receive and amplify the first radio frequency signal: and a through switch, wherein two ends of the through switch are respectively electrically connected to two ends of the first low-noise amplifier, the first radio frequency signal is transmitted through the through switch in a case that the through switch is turned on, and the first radio frequency signal is transmitted through the first low-noise amplifier in a case that the through switch is turned off.

For example, the first radio frequency integrated circuit includes: a second low-noise amplifier connected to the first front-end module, wherein the second low-noise amplifier is configured to receive and amplify a radio frequency signal sent by the first front-end module: a first local oscillator configured to generate a first local oscillator signal: at least one first mixer, wherein each of the at least one first mixer includes a first connecting end, a second connecting end and a third connecting end, the first connecting end and the second connecting end are electrically connected to the second low-noise amplifier and the first local oscillator respectively, and the at least one first mixer is configured to receive the radio frequency signal sent by the second low-noise amplifier and the first local oscillator signal and demodulate the radio frequency signal based on the first local oscillator signal to generate the first baseband signal, and at least one first low-pass filter electrically connected to the third connecting end of the at least one first mixer, wherein the at least one first low-pass filter is configured to respectively receive at least one first baseband signal sent by the at least one first mixer and filter the at least one first baseband signal.

For example, the baseband chip includes: a digital predistorter electrically connected to the first radio frequency integrated circuit, wherein the digital predistorter is configured to perform a predistortion processing on the first baseband signal: a baseband electrically connected to the digital predistorter, wherein the baseband is configured to decode the predistorted first baseband signal and output the data processing result: and a plurality of CPU cores configured to control the digital predistorter and the baseband.

For example, the device of processing data further includes: a first filter, wherein two ends of the first filter are electrically connected to the receiving antenna and the first front-end module respectively, and the first filter is configured to filter a specific frequency band signal in the first radio frequency signal.

For example, the device of processing data further includes: a second filter, wherein two ends of the second filter are electrically connected to the first front-end module and the first radio frequency integrated circuit respectively, and the second filter is configured to filter a specific frequency band signal in the amplified first radio frequency signal.

For example, the device of processing data further includes: an analog-to-digital signal converter, wherein two ends of the analog-to-digital signal converter are electrically connected to the first radio frequency integrated circuit and the baseband chip respectively, and the analog-to-digital signal converter is configured to convert the first baseband signal from an analog signal to a digital signal.

For example, the device of processing data further includes: a first digital interface, wherein two ends of the first digital interface are electrically connected to the analog-to-digital signal converter and the baseband chip respectively, and the first digital interface is configured to transmit the digital signal.

For example, the device of processing data further includes: a memory electrically connected to the baseband chip, wherein the memory is configured to transmit the data to the baseband chip.

For example, the device of processing data further includes: a network component electrically connected to the baseband chip, wherein the network module is configured to transmit a network signal to the baseband chip, and the network component includes an external signal interface, a transformer, a signal converter and a switch.

According to a second aspect, the present disclosure provides a device of processing data based on a radio frequency identification, including: a baseband chip configured to encode to-be-processed data to obtain a second baseband signal: a second radio frequency integrated circuit electrically connected to the baseband chip, wherein the second radio frequency integrated circuit is configured to modulate the second baseband signal to obtain a second radio frequency signal: a second front-end module electrically connected to the second radio frequency integrated circuit, wherein the second front-end module is configured to receive and amplify the second radio frequency signal: and a transmitting antenna electrically connected to the second front-end module, wherein the transmitting antenna is configured to transmit the amplified second radio frequency signal.

For example, the baseband chip includes: a baseband configured to encode the to-be-processed data to obtain the second baseband signal: a digital predistorter electrically connected to the baseband, wherein the digital predistorter is configured to perform a predistortion processing on the second baseband signal: and a plurality of CPU cores configured to control the digital predistorter and the baseband.

For example, the second radio frequency integrated circuit includes: at least one second low-pass filter configured to receive the second baseband signal and filter the second baseband signal: a second local oscillator configured to generate a second local oscillator signal: at least one second mixer, wherein each of the at least one second mixer includes a fourth connecting end, a fifth connecting end and a sixth connecting end, the fourth connecting end and the fifth connecting end are electrically connected to the second local oscillator and one of the at least one second low-pass filter respectively, and the at least one second mixer is configured to receive a baseband signal filtered by the at least one second low-pass filter and the second local oscillator, and modulate the baseband signal based on the second local oscillator signal to obtain the second radio frequency signal, and a first power amplifier electrically connected to the at least one second mixer, wherein the first power amplifier is configured to receive and amplify the second radio frequency signal.

For example, the second front-end module includes: a second power amplifier electrically connected to the second radio frequency integrated circuit, wherein the second power amplifier is configured to receive and amplify a radio frequency signal sent by the second radio frequency integrated circuit.

For example, the device of processing data further includes: a first filter, wherein two ends of the first filter are electrically connected to the transmitting antenna and the second front-end module respectively, and the first filter is configured to filter a specific frequency band signal in the amplified second radio frequency signal.

For example, the device of processing data further includes: a third filter, wherein two ends of the third filter are electrically connected to the second front-end module and the second radio frequency integrated circuit respectively, and the third filter is configured to filter a specific frequency band signal in the second radio frequency signal.

For example, the device of processing data further includes: a digital-to-analog signal converter, wherein two ends of the digital-to-analog signal converter are electrically connected to the second radio frequency integrated circuit and the baseband chip respectively, and the digital-to-analog signal converter is configured to convert the second baseband signal from a digital signal to an analog signal.

For example, the device of processing data further includes: a second digital interface, wherein two ends of the second digital interface are electrically connected to the digital-to-analog signal converter and the baseband chip respectively, and the second digital interface is configured to transmit the analog signal.

For example, the device of processing data further includes: a memory electrically connected to the baseband chip, wherein the memory is configured to transmit data to the baseband chip.

According to a third aspect, the present disclosure further provides a device of processing data based on a radio frequency identification, including: a baseband chip: a first radio frequency integrated circuit electrically connected to the baseband chip: a second radio frequency integrated circuit electrically connected to the baseband chip: a first front-end module electrically connected to the first radio frequency integrated circuit, wherein the first front-end module, the first radio frequency integrated circuit and the baseband chip are electrically connected to form a receiving channel: a second front-end module electrically connected to the second radio frequency integrated circuit, wherein the second front-end module, the second radio frequency integrated circuit and the baseband chip are electrically connected to form a transmitting channel: a common antenna: and a radio frequency switch including a first end, a second end and a third end, wherein the first end is electrically connected to the common antenna, the second end and the third end are electrically connected to the receiving channel and the transmitting channel respectively, and the radio frequency switch is configured to gate the receiving channel and the transmitting channel.

According to a fifth aspect, the present disclosure further provides an office device, including: a camera configured to acquire image data: a display configured to acquire text data, display an image result and display a text result: an audio apparatus configured to acquire audio data and output an audio result: the device of processing data provided by the present disclosure electrically connected to the camera, the display and the audio apparatus, wherein the device of processing data is configured to process the image data, the audio data and the text data to generate and transmit a second radio frequency signal: and another device of processing data provided by the present disclosure electrically connected to the device of processing data, the display and the audio apparatus, wherein the device of processing data is configured to receive and process a first radio frequency signal to output the image result, the audio result and the text result.

According to a sixth aspect, the present disclosure further provides an office device, including: a camera configured to acquire image data: a display configured to acquire text data, display an image result and display a text result: an audio apparatus configured to acquire audio data and output an audio result: and the device of processing data provided by the present disclosure electrically connected to the camera, the display and the audio apparatus, wherein the device of processing data is configured to process the image data, the audio data and the text data to generate and transmit a second radio frequency signal, and receive and process the first radio frequency signal to output the image result, the audio result and the text result.

According to a seventh aspect, the disclosure further provides an office method, which is applied to the office device provided by the disclosure, and the office method includes: acquiring, in a case that an authorization of a visitor is acquired, an identity information of the visitor through a camera, a display or an audio apparatus: identifying, in a case of determining that the identity information of the visitor passes verification, an access right of the visitor through a first node by using a device of processing data in response to a request of the visitor: starting, in a case of determining that the request is matched with the access right, an office service for the visitor at the first node by using the device of processing data: and controlling, in a case of determining that the request is not matched with the access right, the first node to send the request to a second node by using the device of processing data, so that the second node processes the request: wherein the first node and the second node are respectively connected to a terminal, and the access right of the second node is greater than the access right of the first node.

For example, the starting, in a case of determining that the request is matched with the access right, an office service for the visitor at the first node by using the device of processing data includes: sending a business project to the second node through the first node by using the device of processing data: sending a feedback result related to the business project to the first node through the second node by using the device of processing data: in a case of determining that the feedback result is the business project passing an audit, processing the business project through the second node by using the device of processing data: and in a case of determining that the feedback result is the business project not passing the audit, adjusting the business project through the first node by using the device of processing data, and returning the operation of sending the business project to the second node through the first node by using the device of processing data.

For example, the office method further includes: reading to-be-processed data and a key through the first node by using the device of processing data, wherein the to-be-processed data includes data received from a public network: decoding, by using the device of processing the date, the to-be-processed data at the first node according to the key to obtain decrypted data; and in a case of determining that the first node has no right to receive the decrypted data, sending the decrypted data to the second node by using the device of processing the date, so that the second node receives the decrypted data.

For example, the office method further includes: acquiring original data and a key through the first node by using the device of processing the date, wherein the original data includes data sent to a public network: encoding, by using the device of processing data, the original data at the first node according to the key to obtain encrypted data: and in a case of determining that the first node has no right to send the encrypted data, sending the encrypted data to the second node by using the device of processing data, so that the second node sends the encrypted data.

According to an eighth aspect, the present disclosure further provides an office apparatus, which is applied to the office device provided by the present disclosure, and the office apparatus includes: an acquisition module configured to acquire, in a case that an authorization of a visitor is acquired, an identity information of the visitor through a camera, a display or an audio apparatus: a first determination module configured to identify, in a case of determining that the identity information of the visitor passes verification, an access right of the visitor through a first node by using a device of processing data in response to a request of the visitor: a second determination module configured to start, in a case of determining that the request is matched with the access right, an office service for the visitor at the first node by using the device of processing data: and a third determination module configured to control, in a case of determining that the request is not matched with the access right, the first node to send the request to a second node by using the device of processing data, so that the second node processes the request: wherein the first node and the second node are respectively connected to a terminal, and the access right of the second node is greater than the access right of the first node.

According to a ninth aspect, the present disclosure further provides a computer-readable storage medium having executable instructions stored thereon, wherein the instructions, when executed by a processor, are configured to cause the processor to implement the method provided by the present disclosure.

According to a tenth aspect, the present disclosure further provides a computer program product containing a computer program, wherein the computer program, when executed by a processor, is configured to implement the method provided by the present disclosure.

DETAILED DESCRIPTION OF EMBODIMENTS

Figure 1A:
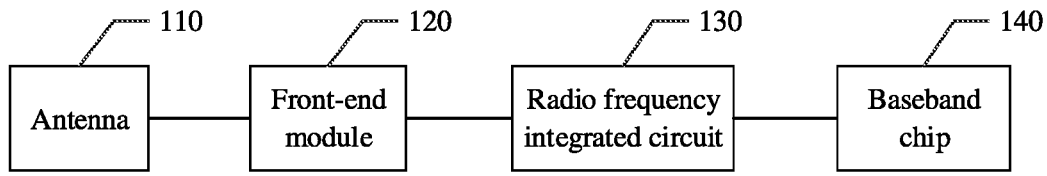
FIG. 1A shows a schematic diagram of a device of processing data based on a radio frequency identification according to an embodiment of the present disclosure.

In order to make objectives, technical solutions and advantages of the present disclosure clearer, the technical solution in embodiments of the present disclosure will be described clearly and completely in combination with accompanying drawings in embodiments of the present disclosure. Obviously, the described embodiments are some, but not all of embodiments of the present disclosure. Based on the described embodiments of the present disclosure, all other embodiments obtained by those skilled in the art without any creative work fall within the scope of protection of the present disclosure. It should be noted that throughout the accompanying drawings, the same elements are indicated by the same or similar reference numerals. In the following descriptions, some specific embodiments are only used for the purpose of description, and should not be construed as limiting the present disclosure, but as examples of embodiments of the present disclosure. When it may cause confusion in the understanding of the present disclosure, conventional structures or configurations may be omitted. It should be noted that the shapes and dimensions of components in the drawings do not necessarily reflect actual sizes and/or ratios, but merely illustrate the content of embodiments of the present disclosure.

Unless otherwise defined, technical or scientific terms used in the present disclosure shall have ordinary meanings as understood by those skilled in the art to which the present disclosure belongs. As used in the present disclosure, "first," "second," and similar terms do not denote any order, quantity, or importance, but are merely used to distinguish different components.

In addition, in the descriptions of embodiments of the present disclosure, terms "connected" or "connected to" may mean that two components are directly connected to each other, or that two components are connected to each other via one or more other components. In addition, the two components may be connected or coupled to each other by a wired or wireless method.

FIG. 1A shows a schematic diagram of a device of processing data based on a radio frequency identification according to an embodiment of the present disclosure.

As shown in FIG. 1A, a device 100a of processing data based on a radio frequency identification includes an antenna 110, a front-end module 120, a radio frequency integrated circuit 130 and a baseband chip 140. The antenna 110, the front-end module 120, the radio frequency integrated circuit 130 and the baseband chip 140 are electrically connected in sequence.

The device 100a of processing the data based on the radio frequency identification is used to modulate and demodulate a radio frequency signal.

For example, the device 100a of processing the data based on the radio frequency identification modulates to-be-processed data as an information required to be transmitted onto a carrier according to a certain rule to generate the radio frequency signal to be transmitted to a base station.

In a modulation process, the baseband chip 140 encodes the to-be-processed data to generate a baseband information. The radio frequency integrated circuit 130 receives the baseband information and modulates the baseband information to generate the radio frequency signal. The front-end module 120 receives the radio frequency signal and amplifies the radio frequency signal, so that the radio frequency signal that may be transmitted by the antenna 110 to the base station may be detected. The to-be-processed data may include audio data, image data and text data.

For example, the device 100a of processing the data based on the radio frequency identification demodulates the received radio frequency signal according to a certain rule to obtain a transmission information carried by the radio frequency signal.

In a demodulation process, the antenna 110 receives the radio frequency signal transmitted by the base station, and the radio frequency signal received by the antenna 110 is a weak electromagnetic wave signal. The front-end module 120 amplifies the weak radio frequency signal and increases a gain in a case of reducing noise. The radio frequency integrated circuit 130 demodulates the amplified radio frequency signal to obtain the baseband information. The baseband chip 140 receives the baseband signal and decodes the baseband information to obtain the transmission information carried by the radio frequency signal.

Figure 1B:
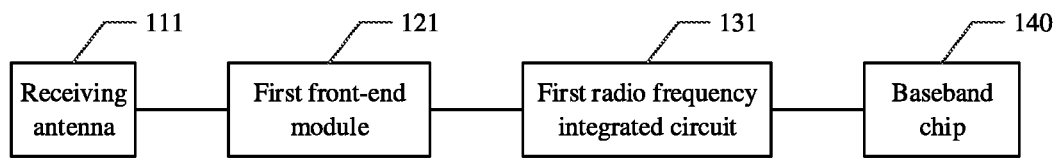
FIG. 1B shows a schematic diagram of a device of processing data based on a radio frequency identification according to another embodiment of the present disclosure.

FIG. 1B shows a schematic diagram of a device of processing data based on a radio frequency identification according to another embodiment of the present disclosure.

As shown in FIG. 1B, a device 100b of processing data based on a radio frequency identification includes a receiving antenna 111, a first front-end module 121, a first radio frequency integrated circuit 131 and a baseband chip 140. The receiving antenna 111, the first front-end module 121, the first radio frequency integrated circuit 131 and the baseband chip 140 are electrically connected in sequence.

In embodiments of the present disclosure, the receiving antenna 111 receives a first radio frequency signal transmitted by the base station. The operation performed by the receiving antenna 111 is similar to the operation performed by the antenna 110 in the demodulation process, which will not be repeated here. The first front-end module 121 receives and amplifies the first radio frequency signal sent by the receiving antenna 111. The operation performed by the first front-end module 121 is similar to the operation performed by the front-end module 120 in the demodulation process, which will not be repeated here. The first radio frequency integrated circuit 131 demodulates the amplified first radio frequency signal sent by the first front-end module 121 to obtain a first baseband signal. The operation performed by the first radio frequency integrated circuit 131 is similar to the operation performed by the radio frequency integrated circuit 130 in the demodulation process, which will not be repeated here. The baseband chip 140 receives the first baseband signal, decodes the first baseband signal, and outputs a data processing result.

Figure 1C:
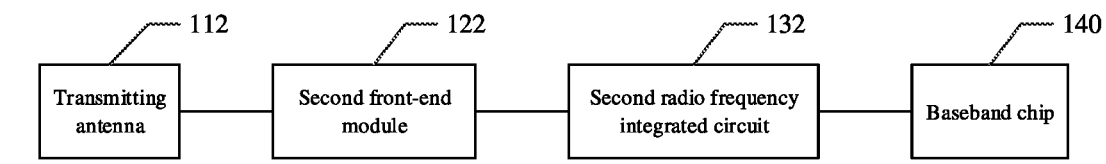
FIG. 1C shows a schematic diagram of a device of processing data based on a radio frequency identification according to another embodiment of the present disclosure.

FIG. 1C shows a schematic diagram of a device of processing data based on a radio frequency identification according to another embodiment of the present disclosure.

As shown in FIG. 1C, a device 100c of processing data based on a radio frequency identification includes a transmitting antenna 112, a second front-end module 122, a second radio frequency integrated circuit 132 and a baseband chip 140. The transmitting antenna 112, the second front-end module 122, the second radio frequency integrated circuit 132 and the baseband chip 140 are electrically connected in sequence.

In embodiments of the present disclosure, the baseband chip 140 encodes the to-be-processed data as the information required to be transmitted to obtain a second baseband signal. The second radio frequency integrated circuit 132 receives the second baseband signal sent by the baseband chip and modulates the second baseband signal to obtain a second radio frequency signal. The operation performed by the second radio frequency integrated circuit 132 is similar to the operation performed by the radio frequency integrated circuit 130 in the modulation process, which will not be repeated here. The second front-end module 121 receives and amplifies the second radio frequency signal. The operation performed by the second front-end module 121 is similar to the operation performed by the front-end module in the modulation process, which will not be repeated here. The transmitting antenna 112 receives and transmits the amplified second radio frequency signal.

In some embodiments, a transmission information carried by the first radio frequency signal may be different from a transmission information carried by the second radio frequency signal.

For example, the device 100a of processing the data includes the device 100b of processing the data and the device 100c of processing the data. The device 100b of processing the data and the device 100c of processing the data may be integrated on a same terminal device, or may be integrated on different terminal devices, so as to perform an information communication by a wireless or wired method. The first radio frequency signal is a radio frequency signal received by the device 100b of processing the data. The first radio frequency signal is demodulated to obtain the transmission information carried by the first radio frequency signal, and the transmission information may be displayed to a user A. The second radio frequency signal is a radio frequency signal transmitted by the device 100c of processing the data to the base station, and carries the transmission information that the user A wants to send.

In some embodiments, the transmission information carried by the first radio frequency signal may be the same as the second radio frequency signal.

For example, the device 100a of processing the data includes the device 100b of processing the data or the device 100c of processing the data. The device 100b of processing the data and the device 100c of processing the data may be integrated in different terminal devices. The device 100c of processing the data modulates the information that the user A wants to transmit onto the carrier to generate the second radio frequency signal, and transmits the second radio frequency signal to the base station. The device 100b of processing the data receives the second radio frequency signal transmitted by the base station, and demodulates the second radio frequency signal to obtain the transmission information, and the transmission information may be displayed to a user B.

Figure 2:
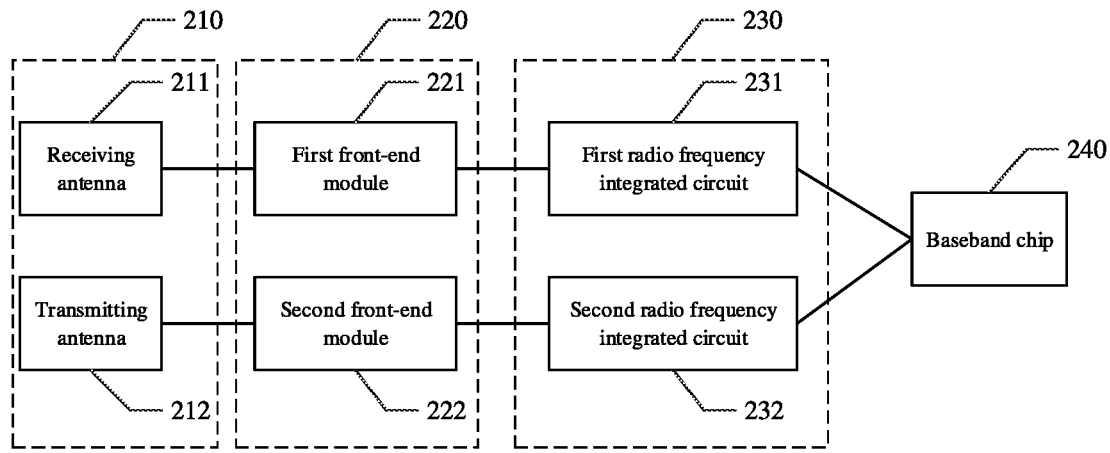
FIG. 2 shows a schematic diagram of a device of processing data based on a radio frequency identification according to another embodiment of the present disclosure.

FIG. 2 shows a schematic diagram of a device of processing data based on a radio frequency identification according to another embodiment of the present disclosure.

As shown in FIG. 2, a device 200 of processing data based on a radio frequency identification includes an antenna 210, a front-end module 220, a radio frequency integrated circuit 230 and a baseband chip 240. The antenna 210 includes a receiving antenna 211 and a transmitting antenna 212. The front-end module 220 includes a first front-end module 221 and a second front-end module 222. The radio frequency integrated circuit 230 includes a first radio frequency integrated circuit 231 and a second radio frequency integrated circuit 232.

The receiving antenna 211, the first front-end module 221, the first radio frequency integrated circuit 231 and the baseband chip 240 respectively perform similar operations to the operations performed by the receiving antenna 111, the first front-end module 121, the first radio frequency integrated circuit 131 and the baseband chip 140 in the above-mentioned embodiments, which will not be repeated here. The transmitting antenna 212, the second front-end module 222, and the second radio frequency integrated circuit 232 respectively perform similar operations to the operations performed by the transmitting antenna 112, the second front-end module 122, and the second radio frequency integrated circuit 132 in the above-mentioned embodiments, which will not be repeated here.

The receiving antenna 211, the first front-end module 221, the first radio frequency integrated circuit 231 and the baseband chip 240 are electrically connected in sequence to form a receiving channel. The transmitting antenna 212, the second front-end module 222, the second radio frequency integrated circuit 232 and the baseband chip 240 are electrically connected in sequence to form a transmitting channel.

In embodiments of the present disclosure, the receiving antenna and the transmitting antenna may be 3.1 GHz antennas or 2.4/5 GHZ antennas. The baseband chips may be a Field Programmable Gate Array (FPGA), an X86 processor and a wireless system single chip RFSOC.

For example, the receiving antenna and the transmitting antenna are 3.1 GHz antennas, and the baseband chip is FPGA. For example, the receiving antenna and the transmitting antenna are 3.1 GHz antennas, and the baseband chip is an X86 processor. For example, the receiving antenna and the transmitting antenna are 3.1 GHz antennas, and the baseband chip is RFSOC. For example, the receiving antenna and the transmitting antenna are 2.4/5 GHz antennas, and the baseband chip is FPGA. For example, the receiving antenna and the transmitting antenna are 2.4/5 GHz antennas, and the baseband chip is an X86 processor. For example, the receiving antenna and the transmitting antenna are 2.4/5 GHz antennas, and the baseband chip is RFSOC.

Through the 3.1 GHz antenna, the device of processing data running in an intranet may be designed in a non-public frequency band. In an intranet space, the device of processing data may not be interfered by an external signal, and has advantages of a high frequency, a good spectrum resource, a fast transmission rate and a wide bandwidth, which may meet more user requirements. Through the 2.4/5 GHz antenna, the device of processing data running in a wireless network may be designed in a WIFI frequency band to realize a wireless interaction of data.

A real-time operation may be performed through FPGA, which may have a low time delay. The X86 processor may realize an engineering application. The RFSOC adopts a hard-core acceleration technology, which has advantages of a fast speed and a wider bandwidth. The device of processing data integrated with the RFSOC has a lower power consumption, a higher integration and a smaller size.

Figure 3:
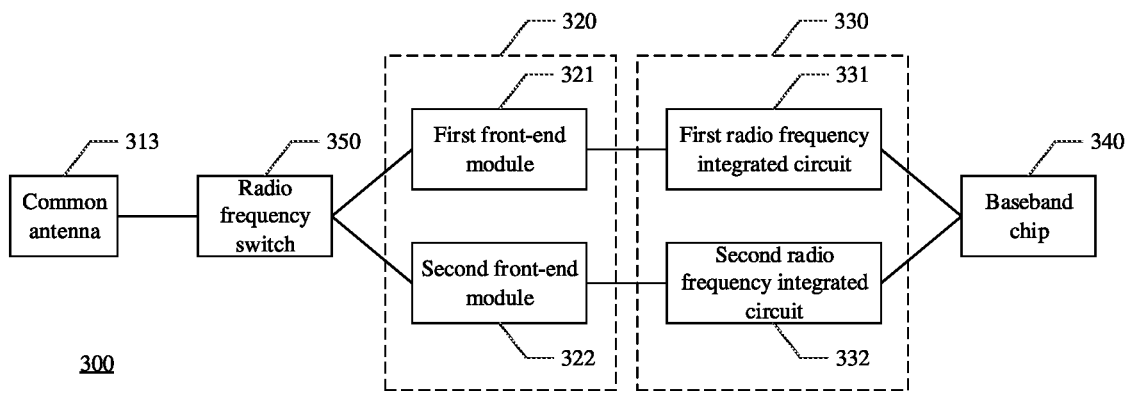
FIG. 3 shows a schematic diagram of a device of processing data based on a radio frequency identification according to another embodiment of the present disclosure.

FIG. 3 shows a schematic diagram of a device of processing data based on a radio frequency identification according to another embodiment of the present disclosure.

As shown in FIG. 3, a device 300 of processing data based on a radio frequency identification includes a common antenna 310, a front-end module 320, a radio frequency integrated circuit 330, a baseband chip 340 and a radio frequency switch 350. The front-end module 320 includes a first front-end module 321 and a second front-end module 322. The radio frequency integrated circuit 330 includes a first radio frequency integrated circuit 331 and a second radio frequency integrated circuit 332.

The common antenna 310, the first front-end module 321, the first radio frequency integrated circuit 331, the second front-end module 322, the second radio frequency integrated circuit 3321 and the baseband chip 340 respectively perform similar operations to the operations performed by the antenna 110, the first front-end module 121, the first radio frequency integrated circuit 131, the second front-end module 122, the second radio frequency integrated circuit 132 and the baseband chip 140 in the above-mentioned embodiments, which will not be repeated here.

The first front-end module 321, the first radio frequency integrated circuit 331 and the baseband chip 340 are electrically connected in sequence to form the receiving channel. The second front-end module 322, the second radio frequency integrated circuit 332 and the baseband chip 340 are electrically connected in sequence to form the transmitting channel. The radio frequency switch 350 includes a first end, a second end and a third end. The first end is electrically connected to the common antenna 310, and the second end and the third end are electrically connected to the receiving channel and the transmitting channel respectively. The radio frequency switch 350 is used to gate the receiving channel and the transmitting channel.

For example, the radio frequency switch 350 may be a single-pole double-throw switch. In a case that the first end and the second end are turned on, the common antenna 310 is used to receive the radio frequency signal transmitted by the base station. In a case that the first terminal and the third terminal are turned on, the common antenna 310 is used to transmit the radio frequency signal to the base station.

Figure 4:
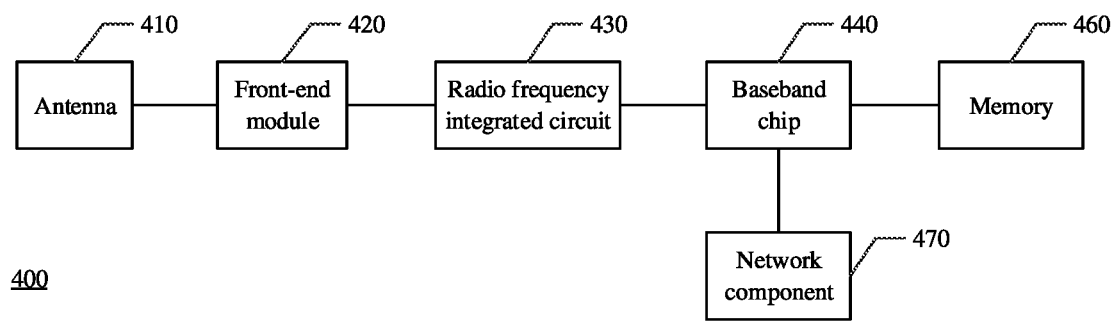
FIG. 4 shows a schematic diagram of a device of processing data based on a radio frequency identification according to another embodiment of the present disclosure.

FIG. 4 shows a schematic diagram of a device of processing data based on a radio frequency identification according to another embodiment of the present disclosure.

As shown in FIG. 4, a device 400 of processing data based on a radio frequency identification includes an antenna 410, a front-end module 420, a radio frequency integrated circuit 430, a baseband chip 440, a memory 460 and a network component 470. The antenna 410, the front-end module 420, the radio frequency integrated circuit 430 and the baseband chip 440 are electrically connected to each other. Both the memory 460 and the network component 470 are electrically connected to the baseband chip 440. The antenna 410, the front-end module 420, the radio frequency integrated circuit 430, and the baseband chip 440 perform similar operations to the operations performed by the antenna 110, the front-end module 120, the radio frequency integrated circuit 130, and the baseband chip 140 in the above-mentioned embodiments, which will not be repeated here.

In embodiments of the present disclosure, the memory 460 is used to transmit data to the baseband chip. For example, the memory 460 includes a volatile memory and/or a nonvolatile memory. The volatile memory may include a Double Data Rate (DDR) memory. The nonvolatile memory may include an Embedded Multi Media Card (eMMC). In a case that the device 400 of processing the data has a slow operation rate, the DDR memory may be used preferentially. In a case of a large computing requirement, the eMMC may be selected. The DDR memory and the eMMC may be used separately or in combination.

The network component 470 is used to transmit a network signal to the baseband chip. The network component 470 may be a hardware facility that provides the network signal. For example, the network component includes an external signal interface, a transformer, a signal converter and a switch.

Figure 5:
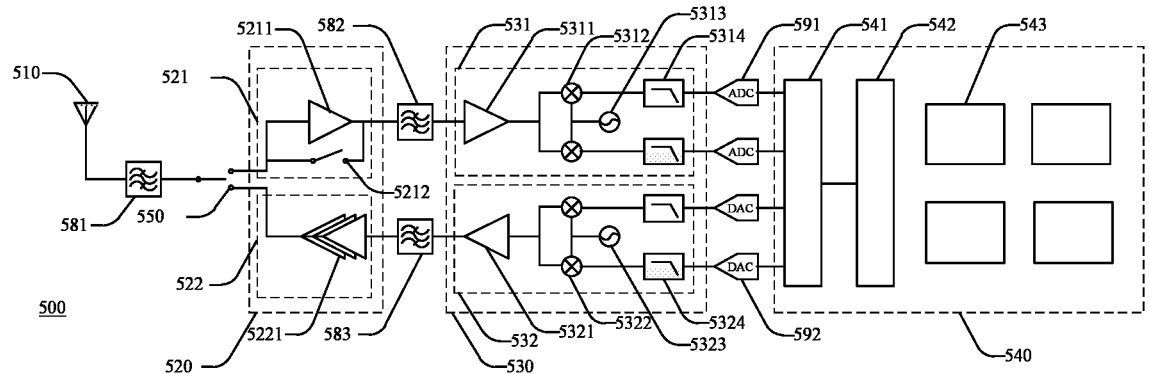
FIG. 5 shows a schematic diagram of a device of processing data based on a radio frequency identification according to another embodiment of the present disclosure.

FIG. 5 shows a schematic diagram of a device of processing data based on a radio frequency identification according to another embodiment of the present disclosure.

As shown in FIG. 5, a device 500 of processing data based on a radio frequency identification includes a common antenna 510, a front-end module 520, a radio frequency integrated circuit 530, a baseband chip 540 and a radio frequency switch 550. The front-end module 520 includes a first front-end module 521 and a second front-end module 522. The radio frequency integrated circuit 530 includes a first radio frequency integrated circuit 531 and a second radio frequency integrated circuit 532.

The common antenna 510 and the radio frequency switch 550 respectively perform similar operations to the operations performed by the common antenna 310 and the radio frequency switch 350 in the above-mentioned embodiments, which will not be repeated here.

The first front-end module 521, the first radio frequency integrated circuit 531 and the baseband chip 540 are electrically connected in sequence to form the receiving channel. The second front-end module 522, the second radio frequency integrated circuit 532 and the baseband chip 540 are electrically connected in sequence to form the transmitting channel. The radio frequency switch 550 includes a first end, a second end and a third end. The first end is electrically connected to the common antenna 510, and the second end and the third end are electrically connected to the receiving channel and the transmitting channel respectively. The radio frequency switch 550 is used to gate the receiving channel and the transmitting channel.

For example, the first front-end module 521 includes a first low-noise amplifier 5211 and a through switch 5212. The first low-noise amplifier 5211 may be electrically connected to the common antenna 510, and the first low-noise amplifier 5211 may also be electrically connected to the receiving antenna. Two ends of the through switch 5212 are electrically connected to two ends of the first low-noise amplifier 5211 respectively. The first low-noise amplifier 5211 is used to receive and amplify the first radio frequency signal. The first low-noise amplifier (LNA) has a very low noise figure. By reducing an amplification of the amplifier's own noise, an interference of the amplifier's own noise on the signal may be reduced, and a signal-to-noise ratio of an output may be improved. The first radio frequency signal is transmitted through the through switch 5212 in a case that the through switch 5212 is turned on. The first radio frequency signal is transmitted through the first low-noise amplifier 5211 in a case that the through switch 5212 is turned off.

For example, the first radio frequency integrated circuit 531 includes a second low-noise amplifier 5311, at least one first mixer 5312, a first local oscillator 5313 and at least one first low-pass filter 5314.

The first mixer 5312 includes a first connecting end, a second connecting end and a third connecting end. The first connecting end and the second connecting end are electrically connected to the second low-noise amplifier 5311 and the first local oscillator 5313 respectively. The third connecting end is electrically connected to one of the at least one first low-pass filter 5314. The second low-noise amplifier 5311 is electrically connected to the first front-end module 520, and the first low-pass filter 5314 is electrically connected to the baseband chip 540.

The second low-noise amplifier 5311 is used to receive and amplify the radio frequency signal sent by the first front-end module 520. The first local oscillator 5313 may generate a first local oscillator signal. The at least one first mixer 5312 is used to receive the radio frequency signal sent by the second low-noise amplifier 5311 and the first local oscillator signal and demodulate the radio frequency signal based on the first local oscillator signal to generate the first baseband signal. An adhesive tape method includes an IQ demodulation, which demodulates an IQ signal from the carrier. The at least one first low-pass filter 5314 is used to respectively receive at least one first baseband signal sent by the at least one first mixer 5312 and filter the at least one first baseband signal. The at least one first mixer 5312 may include two first mixers 5312, and the at least one first low-pass filter 5314 may include two first low-pass filters 5314.

For example, the baseband chip 540 includes a digital predistorter 541, a baseband 542 and a plurality of CPU cores 543. In a case that the radio frequency switch 550 gates the receiving channel, the digital predistorter 541 receives the first baseband signal sent by the first radio frequency integrated circuit 530, and performs a predistortion processing on the first baseband signal. The baseband 542 is electrically connected to the digital predistorter. The baseband 542 is used to decode the predistorted first baseband signal and output the data processing result. The plurality of CPU cores 543 are used to control the digital predistorter 541 and the baseband 542, and provide an operation space for the digital predistorter 541 and the baseband 542.

In a case that the radio frequency switch 550 gates the transmitting channel, the baseband 542 is used to encode the to-be-processed data to obtain the second baseband signal. The digital predistorter 541 is used to perform the predistortion processing on the second baseband signal.

For example, the second radio frequency integrated circuit 532 further includes a first power amplifier 5321, at least one second mixer 5322, a second local oscillator 5323 and at least one second low-pass filter 5324. Each of the at least one second mixer 5322 includes a fourth connecting end, a fifth connecting end and a sixth connecting end. The fourth connecting end and the fifth connecting end are electrically connected to the second local oscillator 5323 and one of the at least one second low-pass filter 5324 respectively, and the sixth connecting end is electrically connected to the first power amplifier 5321. The at least one second low-pass filter 5324 is electrically connected to the baseband chip 540, and the first power amplifier 5321 is electrically connected to the second front-end module 522.

The at least one second low-pass filter 5324 receives the second baseband signal and filters the second baseband signal. The second local oscillator 5323 may generate a second local oscillator signal. Each of the at least one second mixer 5322 receives the second local oscillator signal and the baseband signal filtered by one of the at least one second low-pass filter 5324, and modulates the baseband signal based on the second local oscillator signal to obtain the second radio frequency signal. A radio frequency modulation includes an IQ modulation, which moves the IQ signal output by modulation to the carrier. The first power amplifier 5321 is used to receive and amplify the second radio frequency signal.

For example, the second front-end module 522 includes a second power amplifier 5221. The second power amplifier 5221 is electrically connected to the second radio frequency integrated circuit. The second power amplifier 5221 is used to receive and amplify the radio frequency signal sent by the second radio frequency integrated circuit 532. The second front-end module 522 may include a plurality of second power amplifiers 5221. The plurality of second power amplifiers 5221 amplify the radio frequency signal for many times to avoid that an intensity of the radio frequency signal transmitted by the transmitting antenna is too small to be detected.

The device 500 of processing the data based on the radio frequency identification further includes a first filter 581, a second filter 582, and a third filter 583.

Two ends of the first filter 581 are electrically connected to the common antenna 510 and the first end of the radio frequency switch 550 respectively. The first filter 581 is used to filter a specific frequency band signal in the first radio frequency signal. The first filter 581 is also used to filter a specific frequency band signal in the amplified second radio frequency signal. The specific frequency band signal may be a noise signal.

As an alternative embodiment, in a case that the receiving channel includes the transmitting antenna and the transmitting channel includes the transmitting antenna, two ends of the first filter 581 may be electrically connected to the transmitting antenna and the second front-end module 522 respectively, and two ends of the first filter 581 are also electrically connected to the receiving antenna and the first front-end module 521 respectively. The first filter 581 may further include two filters. Two ends of one of the two filters may be electrically connected to the transmitting antenna and the second front-end module 522 respectively, and two ends of the other of the two filters may be electrically connected to the receiving antenna and the first front-end module 521 respectively.

Two ends of the second filter 582 are electrically connected to the first radio frequency integrated circuit 531 and the first front-end module 521 respectively, and the second filter 582 is used to filter a specific frequency band signal in the amplified first radio frequency signal. Two ends of the third filter 583 are electrically connected to the second front-end module 522 and the second radio frequency integrated circuit 532 respectively, and the third filter 583 is used to filter a specific frequency band signal in the second radio frequency signal.

The device 500 of processing the data based on the radio frequency identification further includes an analog-to-digital converter (ADC) 591 and a digital-to-analog converter (DAC) 592. Two ends of the ADC are electrically connected to the first radio frequency integrated circuit 531 and the baseband chip 540 respectively. The ADC is used to convert the first baseband signal from an analog signal to a digital signal. Two ends of the DAC are electrically connected to the second radio frequency integrated circuit 532 and the baseband chip 540 respectively. The DAC is used to convert the second baseband signal from the digital signal to the analog signal.

The device 500 of processing the data based on the radio frequency identification further includes a first digital interface (not shown in the drawings) and a second digital interface (not shown in the drawings). Two ends of the first digital interface may be electrically connected to the ADC and the baseband chip 540 respectively, and the first digital interface is used to transmit the digital signal. Two ends of the second digital interface may be electrically connected to the DAC and the baseband chip 540 respectively. The first digital interface and the second digital interface are programmable.

Figure 6A:
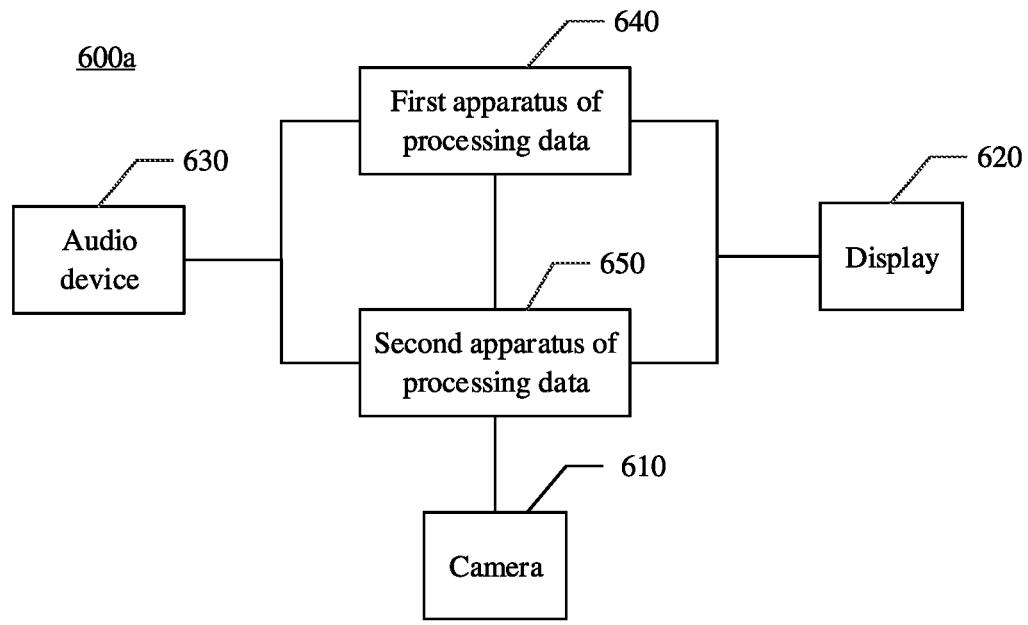
FIG. 6A shows a schematic diagram of an office device according to an embodiment of the present disclosure.

FIG. 6A shows a schematic diagram of an office device according to an embodiment of the present disclosure. As shown in FIG. 6A, an office device 600a includes a camera 610, a display 620, an audio apparatus 630, a first device 640 of processing data, and a second device 650 of processing data. The display 620, the audio apparatus 630 and the second device 650 of processing the data are all electrically connected to the first device 640 of processing the data. The camera 610, the display 620 and the audio apparatus 630 are all electrically connected to the second device 650 of processing the data.

The camera 610 is used to acquire image data. The display 620 is used to acquire text data, a display image result and a display text result. The audio apparatus 630 is used to acquire audio data and an output audio result. The audio apparatus 630 may include a microphone and a speaker. The microphone is used to acquire the audio data, and the speaker is used to output an audio result.

The first device 640 of processing the data receives and processes the first radio frequency signal to output the image result, the audio result and the text result. The operation performed by the first device 640 of processing the data is similar to the operation performed by the device 100*b* of processing the data in the above-mentioned embodiments, which will not be repeated here. The second device 650 of processing the data receives and processes the image data, the audio data and the text data to generate and transmit the second radio frequency signal. The operation performed by the second device 640 of processing the data is similar to the operation performed by the device 100*c* of processing the data in the above-mentioned embodiments, which will not be repeated here.

Figure 6B:
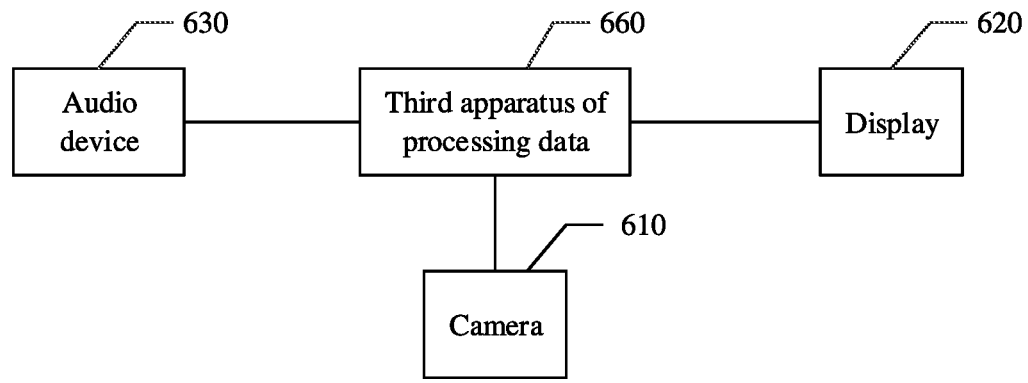
FIG. 6B shows a schematic diagram of an office device according to another embodiment of the present disclosure.

FIG. 6B shows a schematic diagram of an office device according to another embodiment of the present disclosure. As shown in FIG. 6B, an office device 600*b* includes a camera 610, a display 620, an audio apparatus 630 and a third device 660 of processing data. The third device 660 of processing the data is electrically connected to the camera 610, the display 620 and the audio apparatus 630. The camera 610 is used to acquire the image data. The display 620 is used to acquire the text data, display the image result and display the text result. The audio apparatus 630 is used to acquire the audio data and output the audio result.

The third device 660 of processing the data receives and processes the image data, the audio data and the text data to generate and transmit the second radio frequency signal, and receives and processes the first radio frequency signal to output the image result, the audio result and the text result. The operation performed by the third device 660 of processing the data is similar to the operation performed by the devices 100*a*, 300, 400, 500 of processing the data in the above-mentioned embodiments, which will not be repeated here.

Figure 7:
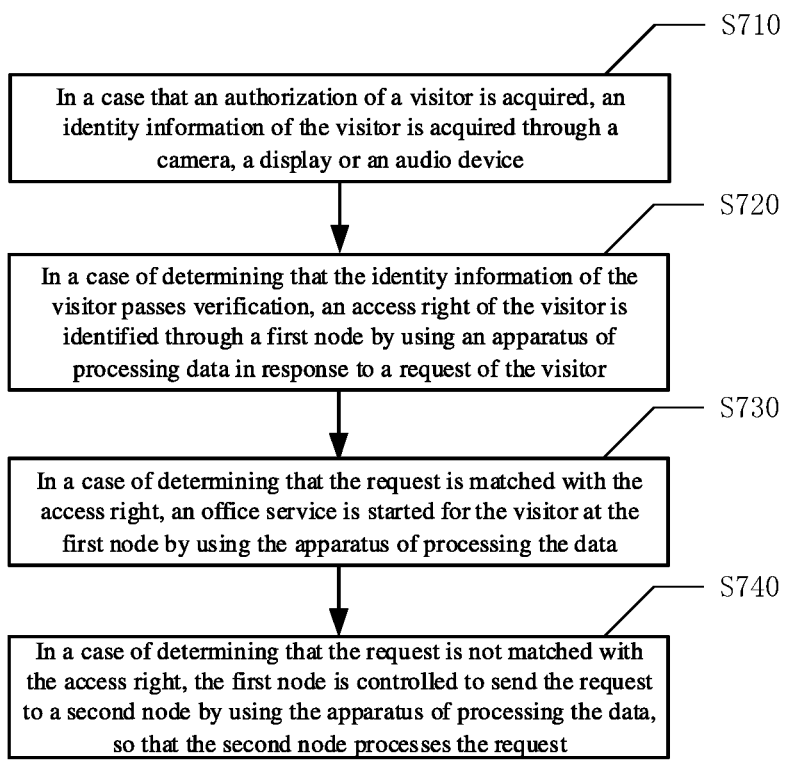
FIG. 7 shows a flowchart of an office method according to an embodiment of the present disclosure.

FIG. 7 shows a flowchart of an office method according to an embodiment of the present disclosure.

As shown in FIG. 7, the office method implemented by the present disclosure may be applied to the office device 600*a* or the office device 600*b* provided by the present disclosure. The office method may include operations S710 to S740.

In operation S710, in a case that an authorization of a visitor is acquired, an identity information of the visitor is acquired through a camera, a display or an audio apparatus.

For example, in the case that the authorization of the visitor is acquired, a face information of the visitor may be acquired through the camera to perform a face recognition on the visitor.

In operation S720, in a case of determining that the identity information of the visitor passes verification, an access right of the visitor is identified through a first node by using a device of processing data in response to a request of the visitor.

For example, the visitor is allowed to use the office device in a case of conforming that the visitor is an internal employee through the face recognition. An office application may be installed on the office device. The visitor may submit an access request in the office application on the office device. For example, the access request may be to view a content of a business project.

The first node may be a login node of the visitor, and the access right of the visitor may be determined by identifying an ip address of the first node.

In operation S730, in a case of determining that the request is matched with the access right, an office service is started for the visitor at the first node by using the device of processing data.

In operation S740, in a case of determining that the request is not matched with the access right, the first node is controlled to send the request to a second node by using the device of processing data, so that the second node processes the request.

For example, the first node and the second node are respectively connected to a terminal, and the access right of the second node is greater than the access right of the first node. The visitor may use the office device through the terminal connected to the first node or the second node. The office device may be installed in the terminal, or may also be installed outside the terminal. The office device is connected to the terminal by a wired or wireless method.

In a case that the visitor who logs in to the office device through the first node has no access right, the visitor may apply to a second node. After receiving a permission instruction sent by the second node, the visitor may access a corresponding business project content through the first node. The first node and the second node may be connected to databases respectively, and the first node and the second node may be connected to a same database or different databases. A connection of the database and nodes with different priorities may control an access of different nodes to the database to ensure a security and a timeliness of data. Through the first node, the visitor may also automatically enter a workflow link, which may reduce a work arrangement process, effectively save time and realize an automatic work, and may remotely activate the office devices such as a computer, a printer, etc.

In embodiments of the present disclosure, the operation S730 of starting, in a case of determining that the request is matched with the access right, an office service for the visitor at the first node by using the device of processing data includes: sending a business project to the second node through the first node by using the device of processing data: sending a feedback result related to the business project to the first node through the second node by using the device of processing data: in a case of determining that the feedback result is the business project passing an audit, processing the business project through the second node by using the device of processing data: and in a case of determining that the feedback result is the business project not passing the audit, adjusting the business project through the first node by using the device of processing data, and returning the operation of sending the business project to the second node through the first node by using the device of processing data until the business project passes the audit or the business project is finished.

In embodiments of the present disclosure, the first node and the second node transmit data through an internal communication node. The second node with a higher authority publishes the business project and sends a work content of the business project to the first node. The first node and the second node may transmit data through the internal communication node to determine information such as a project level, a project requirement, a project planning content, etc. The second node may be used as an audit node to audit contents submitted by the first node one by one, so as to adjust the project. A data interaction between the first node and the second node is performed in an iterative way to promote a progress of the project.

In embodiments of the present disclosure, on the basis of operations S710 to S740, the office method further includes: reading to-be-processed data and a key through the first node by using the device of processing data, wherein the to-be-processed data includes data received from a public network: decoding, by using the device of processing the date, the to-be-processed data at the first node according to the key to obtain decrypted data: and in a case of determining that the first node has no right to receive the decrypted data, sending the decrypted data to the second node by using the device of processing the date, so that the second node receives the decrypted data.

On the basis of operations S710 to S740, the office method further includes: acquiring original data and a key through the first node by using the device of processing the date, wherein the original data includes data sent to a public network; encoding, by using the device of processing data, the original data at the first node according to the key to obtain encrypted data: and in a case of determining that the first node has no right to send the encrypted data, sending the encrypted data to the second node by using the device of processing data, so that the second node sends the encrypted data.

In embodiments of the present disclosure, the data interaction between the first node and the second node and the public network may also be performed through a communication node respectively. The communication node may be a server to which the office device is connected. In a case of interacting with data of the public network, it is required to encrypt and transmit the interactive data to ensure a data security.

Both the first node and the second node encrypt and decrypt the data in an intranet, so that the data transmitted in the public network is encrypted data to prevent an information leakage. Both decoding and coding of the data require a set of corresponding encryption and decryption systems to prevent data from being deciphered. For example, after receiving the data sent by the public network, the data is read and the key is added to decode the data, and the data is received after successfully decoding the data. If it is determined that the first node has no right to access the data after decoding the data, the first node may initiate a data verification to the second node through the internal communication node, and may decode the data again after receiving a verification-passed instruction sent by the second node. The first node may also send the data that the first node has no right to receive to the second node, and the second node may perform operations of decoding and receiving the data.

Figure 8:
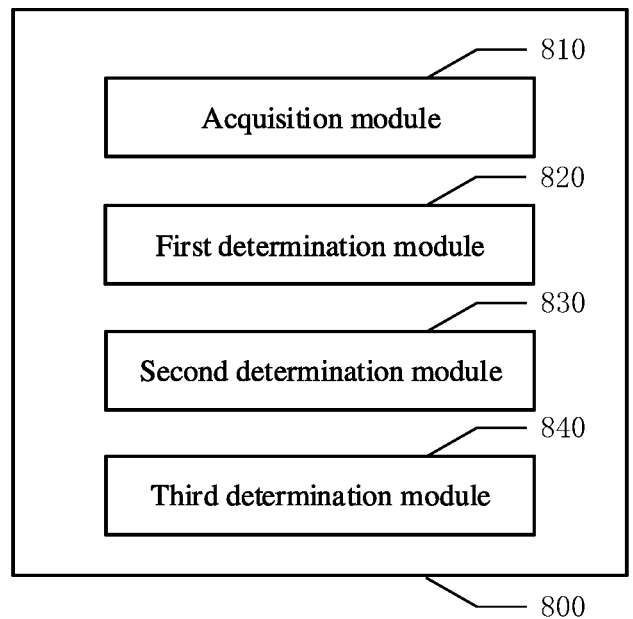
FIG. 8 shows a block diagram of an office apparatus according to an embodiment of the present disclosure.

FIG. 8 shows a block diagram of an office apparatus according to an embodiment of the present disclosure.

As shown in FIG. 8, an apparatus 800 includes an acquisition module 810, a first determination module 820, a second determination module 830 and a third determination module 840.

The acquisition module 810 is used to acquire, in a case that an authorization of a visitor is acquired, an identity information of the visitor through a camera, a display or an audio apparatus.

The first determination module 820 is used to identify, in a case of determining that the identity information of the visitor passes verification, an access right of the visitor through a first node by using a device of processing data in response to a request of the visitor.

The second determination module 830 is used to start, in a case of determining that the request is matched with the access right, an office service for the visitor at the first node by using the device of processing data.

The third determination module 840 is used to control, in a case of determining that the request is not matched with the access right, the first node to send the request to a second node by using the device of processing data, so that the second node processes the request.

Figure 9:
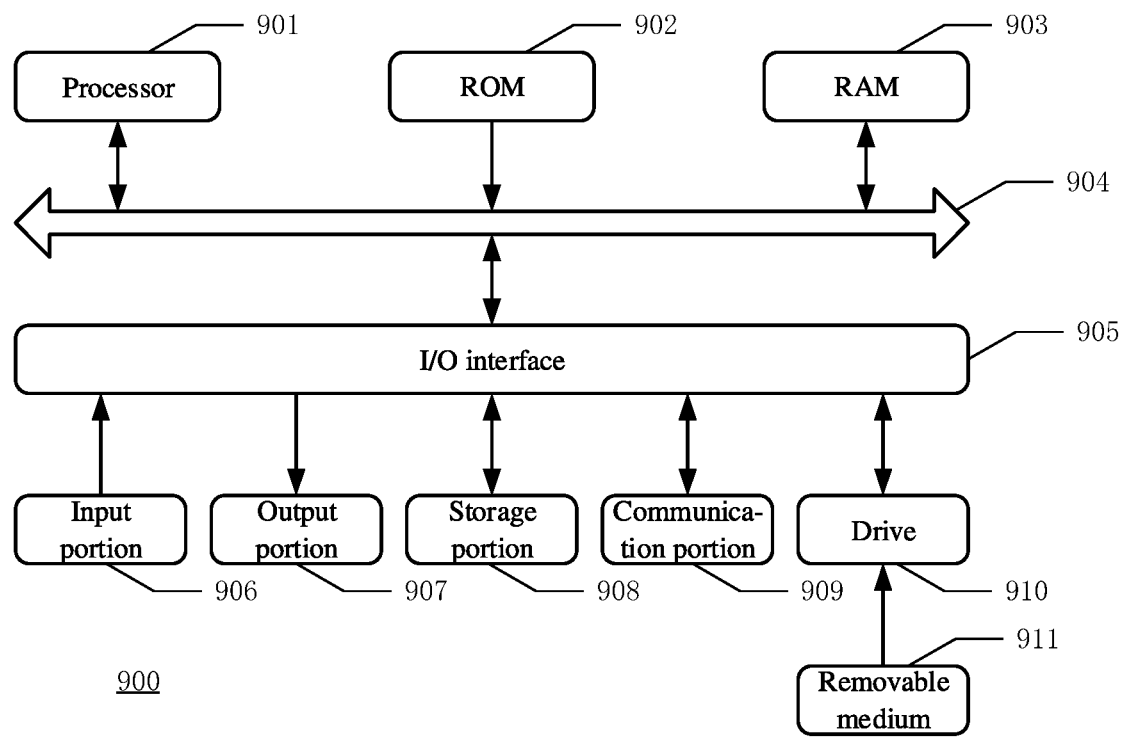
FIG. 9 shows a block diagram of an electronic device for implementing an office method according to an embodiment of the present disclosure.

FIG. 9 shows a block diagram of an electronic device for implementing an office method according to an embodiment of the present disclosure. The electronic device shown in FIG. 9 is only an example, and is not intended to limit the function and scope of use of embodiments of the present disclosure.

As shown in FIG. 9, an electronic device 900 according to embodiments of the present disclosure includes a processor 901, which may perform various appropriate actions and processes according to a program stored in a read only memory (ROM) 902 or a program loaded from a storage portion 908 into a random access memory (RAM) 903. The processor 901 may include, for example, a general-purpose microprocessor (such as a CPU), an instruction set processor and/or a related chipset and/or a dedicated-purpose microprocessor (such as an application specific integrated circuit (ASIC)), etc. The processor 901 may further include an on-board memory for caching purposes. The processor 901 may include a single processing unit or a plurality of processing units for performing different actions of a method flow according to embodiments of the present disclosure.

In the RAM 903, various programs and data required for an operation of the electronic device 900 are stored. The processor 901, the ROM 902 and the RAM 903 are connected to each other via a bus 904. The processor 901 performs various operations of the method flow according to embodiments of the present disclosure by executing programs in the ROM 902 and/or RAM 903. It should be noted that the programs may also be stored in one or more memories other than the ROM 902 and RAM 903. The processor 901 may also perform various operations of the method flow according to embodiments of the present disclosure by executing the programs stored in the one or more memories.

According to embodiments of the present disclosure, the electronic device 900 may further include an input/output (I/O) interface 905, which is also connected to the bus 904. The electronic device 900 may further include one or more of the following components connected to the I/O interface 905: an input portion 906 including a keyboard, a mouse, etc.; an output portion 907 such as a cathode ray tube (CRT), a liquid crystal display (LCD), etc., and a loudspeaker, etc.; a storage portion 908 including a hard disk, etc.; and a communication portion 909 including a network interface card such as a LAN card, a modem, etc.. The communication portion 909 performs communication processing via a network such as the internet. A drive 910 is also connected to the I/O interface 905 as required. A removable medium 911, such as a magnetic disk, optical disk, magneto-optical disk, semiconductor memory, etc., is installed on the drive 910 as required, so that computer programs read therefrom may be installed into the storage portion 908 as required.

According to embodiments of the present disclosure, the method flow according to embodiments of the present disclosure may be implemented as a computer software program. For example, embodiments of the present disclosure include a computer program product, which includes a computer program loaded on a computer-readable storage medium, and the computer program includes a program code for performing the method shown in the flowchart. In the embodiment, the computer program may be downloaded and installed from the network through the communication portion 909, and/or installed from the removable media 911. In a case that the computer program is executed by the processor 901, the above-mentioned functions defined in the system of embodiments of the present disclosure are performed. According to embodiments of the present disclosure, the system, apparatus, device, module, unit and the like as described above may be realized by a computer program module.

The present disclosure further provides a computer-readable storage medium, which may be included in the apparatus/device/system described in the above-mentioned embodiment: the computer-readable storage medium may also exist alone without being assembled into the apparatus/device/system. The above-mentioned computer-readable storage medium carries one or more programs. The one or more programs, when executed, implement the method according to embodiments of the present disclosure.

According to embodiments of the present disclosure, the computer-readable storage medium may be a nonvolatile computer-readable storage medium. For example, the computer-readable storage medium may include, but is not limited to, a portable computer disk, a hard disk, a random access memory (RAM), a read-only memory (ROM), an erasable programmable read-only memory (EPROM or a flash memory), a portable compact disk read-only memory (CD-ROM), an optical storage apparatus, a magnetic storage apparatus, or any suitable combination thereof. In the present disclosure, the computer-readable storage medium may be any tangible medium containing or storing a program, and the program may be used by or used in combination with instruction execution system, apparatus or devices.

For example, according to embodiments of the present disclosure, the computer-readable storage medium may include the ROM 902 and/or the RAM 903 described above and/or one or more memories other than the ROM 902 and/or the RAM 903.

The flowcharts and block diagrams in the accompanying drawings illustrate possibly implemented architectures, functions and operations of the systems, methods and computer program products according to various embodiments of the present disclosure. In this regard, each block in the flowcharts or block diagrams may represent a module, a program segment, or part of a code. The above-mentioned module, program segment, or part of the code contains one or more executable instructions for realizing specified logic functions. It should also be noted that in some alternative implementations, functions marked in the blocks may also occur in a different order from those marked in the accompanying drawings. For example, two consecutive blocks may be actually performed in parallel, and sometimes they may be performed in a reverse order, which depends on the functions involved. It should also be noted that each block in the block diagrams or flowcharts and a combination of blocks in the block diagrams or flowcharts may be implemented by a dedicated hardware-based system that performs specified functions or operations, or by a combination of a dedicated hardware and computer instructions.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Embodiments of the present disclosure have been described above. However, these embodiments are for illustrative purposes only, and are not used to limit the scope of the present disclosure. Although embodiments are described separately above, this does not mean that the measures in various embodiments may not be used advantageously in combination. The scope of the present disclosure is defined by the appended claims and their equivalents. Without departing from the spirit and principles of the present disclosure, those skilled in the art may make various alternatives and equivalent substitutions, and these alternatives and modifications should all fall within the scope of the present disclosure.

What is claimed is:

1. A device of processing data based on a radio frequency identification, comprising:
   a receiving antenna configured to receive a first radio frequency signal;
   a first front-end module electrically connected to the receiving antenna, wherein the first front-end module is configured to receive and amplify the first radio frequency signal;
   a first radio frequency integrated circuit electrically connected to the first front-end module, wherein the first radio frequency integrated circuit is configured to demodulate the amplified first radio frequency signal sent by the first front-end module to obtain a first baseband signal; and
   a baseband chip electrically connected to the first radio frequency integrated circuit, wherein the baseband chip is configured to receive the first baseband signal, decode the first baseband signal, and output a data processing result,
   wherein the first front-end module comprises:
   a first low-noise amplifier electrically connected to the receiving antenna, wherein the first low-noise amplifier is configured to receive and amplify the first radio frequency signal; and
   a through switch, wherein two ends of the through switch are respectively electrically connected to two ends of the first low-noise amplifier, the first radio frequency signal is transmitted through the through switch in a case that the through switch is turned on, and the first radio frequency signal is transmitted through the first low-noise amplifier in a case that the through switch is turned off.

2. The device of processing data according to claim 1, wherein the first radio frequency integrated circuit comprises:
   a second low-noise amplifier connected to the first front-end module, wherein the second low-noise amplifier is configured to receive and amplify a radio frequency signal sent by the first front-end module;
   a first local oscillator configured to generate a first local oscillator signal;
   at least one first mixer, wherein each of the at least one first mixer comprises a first connecting end, a second connecting end and a third connecting end, the first connecting end and the second connecting end are electrically connected to the second low-noise amplifier and the first local oscillator respectively, and the at least one first mixer is configured to receive the radio frequency signal sent by the second low-noise amplifier and the first local oscillator signal and demodulate the radio frequency signal based on the first local oscillator signal to generate the first baseband signal, and
   at least one first low-pass filter respectively electrically connected to the third connecting end of the at least one first mixer, wherein the at least one first low-pass filter is configured to respectively receive at least one first baseband signal sent by the at least one first mixer and filter the at least one first baseband signal.

3. The device of processing data according to claim 1, wherein the baseband chip comprises:
a digital predistorter electrically connected to the first radio frequency integrated circuit, wherein the digital predistorter is configured to perform a predistortion processing on the first baseband signal;
a baseband electrically connected to the digital predistorter, wherein the baseband is configured to decode the predistorted first baseband signal and output the data processing result; and
a plurality of CPU cores configured to control the digital predistorter and the baseband.

4. The device of processing data according to claim 1, further comprising:
a first filter, wherein two ends of the first filter are electrically connected to the receiving antenna and the first front-end module respectively, and the first filter is configured to filter a specific frequency band signal in the first radio frequency signal.

5. The device of processing data according to claim 1, further comprising:
a second filter, wherein two ends of the second filter are electrically connected to the first front-end module and the first radio frequency integrated circuit respectively, and the second filter is configured to filter a specific frequency band signal in the amplified first radio frequency signal.

6. The device of processing data according to claim 1, further comprising: an analog-to-digital signal converter, wherein two ends of the analog-to-digital signal converter are electrically connected to the first radio frequency integrated circuit and the baseband chip respectively, and the analog-to-digital signal converter is configured to convert the first baseband signal from an analog signal to a digital signal,
wherein the device of processing data further comprises:
a first digital interface, wherein two ends of the first digital interface are electrically connected to the analog-to-digital signal converter and the baseband chip respectively, and the first digital interface is configured to transmit the digital signal.

7. The device of processing data according to claim 1, further comprising: a memory electrically connected to the baseband chip, wherein the memory is configured to transmit data to the baseband chip,
wherein the device of processing data further comprises:
a network component electrically connected to the baseband chip, wherein the network module is configured to transmit a network signal to the baseband chip, and the network component comprises an external signal interface, a transformer, a signal converter and a switch.

8. A device of processing data based on a radio frequency identification, comprising:
a baseband chip configured to encode to-be-processed data to obtain a second baseband signal;
a second radio frequency integrated circuit electrically connected to the baseband chip, wherein the second radio frequency integrated circuit is configured to modulate the second baseband signal to obtain a second radio frequency signal;
a second front-end module electrically connected to the second radio frequency integrated circuit, wherein the second front-end module is configured to receive and amplify the second radio frequency signal; and a transmitting antenna electrically connected to the second front-end module, wherein the transmitting antenna is configured to transmit the amplified second radio frequency signal,
wherein the baseband chip comprises:
a baseband configured to encode the to-be-processed data to obtain the second baseband signal;
a digital predistorter electrically connected to the baseband, wherein the digital predistorter is configured to perform a predistortion processing on the second baseband signal; and
a plurality of CPU cores configured to control the digital predistorter and the baseband.

9. The device of processing data according to claim 8, wherein the second radio frequency integrated circuit comprises:
at least one second low-pass filter configured to receive the second baseband signal and filter the second baseband signal;
a second local oscillator configured to generate a second local oscillator signal;
at least one second mixer, wherein each of the at least one second mixer comprises a fourth connecting end, a fifth connecting end and a sixth connecting end, the fourth connecting end and the fifth connecting end are electrically connected to the second local oscillator and one of the at least one second low-pass filter respectively, and the at least one second mixer is configured to receive a baseband signal filtered by the at least one second low-pass filter and the second local oscillator, and modulate the baseband signal based on the second local oscillator signal to obtain the second radio frequency signal, and
a first power amplifier electrically connected to the at least one second mixer, wherein the first power amplifier is configured to receive and amplify the second radio frequency signal.

10. The device of processing data according to claim 8, wherein the second front-end module comprises:
a second power amplifier electrically connected to the second radio frequency integrated circuit, wherein the second power amplifier is configured to receive and amplify a radio frequency signal sent by the second radio frequency integrated circuit.

11. The device of processing data according to claim 8, further comprising:
a first filter, wherein two ends of the first filter are electrically connected to the transmitting antenna and the second front-end module respectively, and the first filter is configured to filter a specific frequency band signal in the amplified second radio frequency signal.

12. The device of processing data according to claim 8, further comprising: a third filter, wherein two ends of the third filter are electrically connected to the second front-end module and the second radio frequency integrated circuit respectively, and the third filter is configured to filter a specific frequency band signal in the second radio frequency signal,
wherein the device of processing data further comprises:
a digital-to-analog signal converter, wherein two ends of the digital-to-analog signal converter are electrically connected to the second radio frequency integrated circuit and the baseband chip respectively, and the digital- to-analog signal converter is configured to convert the second baseband signal from a digital signal to an analog signal, wherein the device of processing data further comprises:
a second digital interface, wherein two ends of the second digital interface are electrically connected to the digital-to-analog signal converter and the baseband chip respectively, and the second digital interface is configured to transmit the analog signal.

13. An office device, comprising:
a camera configured to acquire image data;
a display configured to acquire text data, display an image result and display a text result;
an audio apparatus configured to acquire audio data and output an audio result;
the device of processing data according to claim 8 electrically connected to the camera, the display and the audio apparatus, and configured to process the image data, the audio data and the text data to generate and transmit a second radio frequency signal; and
a device of processing data electrically connected to the device of processing data, the display and the audio apparatus, and configured to receive and process a first radio frequency signal to output the image result, the audio result and the text result,
wherein the device of processing data comprises:
a receiving antenna configured to receive a first radio frequency signal;
a first front-end module electrically connected to the receiving antenna, wherein the first front-end module is configured to receive and amplify the first radio frequency signal;
a first radio frequency integrated circuit electrically connected to the first front-end module, wherein the first radio frequency integrated circuit is configured to demodulate the amplified first radio frequency signal sent by the first front-end module to obtain a first baseband signal; and
a baseband chip electrically connected to the first radio frequency integrated circuit, wherein the baseband chip is configured to receive the first baseband signal, decode the first baseband signal, and output a data processing result.

14. A device of processing data based on a radio frequency identification, comprising:
a baseband chip;
a first radio frequency integrated circuit electrically connected to the baseband chip;
a second radio frequency integrated circuit electrically connected to the baseband chip;
a first front-end module electrically connected to the first radio frequency integrated circuit, wherein the first front-end module, the first radio frequency integrated circuit and the baseband chip are electrically connected to form a receiving channel;
a second front-end module electrically connected to the second radio frequency integrated circuit, wherein the second front-end module, the second radio frequency integrated circuit and the baseband chip are electrically connected to form a transmitting channel;
a common antenna; and
a radio frequency switch comprising a first end, a second end and a third end, wherein the first end is electrically connected to the common antenna, the second end and the third end are electrically connected to the receiving channel and the transmitting channel respectively, and the radio frequency switch is configured to gate the receiving channel and the transmitting channel, wherein the first front-end module comprises:
a first low-noise amplifier electrically connected to the common antenna, wherein the first low-noise amplifier is configured to receive and amplify a first radio frequency signal received by the common antenna; and
a through switch, wherein two ends of the through switch are respectively electrically connected to two ends of the first low-noise amplifier, the first radio frequency signal is transmitted through the through switch in a case that the through switch is turned on, and the first radio frequency signal is transmitted through the first low-noise amplifier in a case that the through switch is turned off.

15. An office method, which is applied to the office device according to claim 13, comprising:
acquiring, in a case that an authorization of a visitor is acquired, an identity information of the visitor through a camera, a display or an audio apparatus;
identifying, in a case of determining that the identity information of the visitor passes verification, an access right of the visitor through a first node by using a device of processing data in response to a request of the visitor;
starting, in a case of determining that the request is matched with the access right, an office service for the visitor at the first node by using the device of processing data; and
controlling, in a case of determining that the request is not matched with the access right, the first node to send the request to a second node by using the device of processing data, so that the second node processes the request;
wherein the first node and the second node are respectively connected to a terminal, and the access right of the second node is greater than the access right of the first node.

16. The office method according to claim 15, wherein the starting, in a case of determining that the request is matched with the access right, an-the office service for the visitor at the first node by using the device of processing data comprises:
sending a business project to the second node through the first node by using the device of processing data;
sending a feedback result related to the business project to the first node through the second node by using the device of processing data;
processing, in a case of determining that the feedback result is the business project passing an audit, the business project through the second node by using the device of processing data; and
adjusting, in a case of determining that the feedback result is the business project not passing the audit, the business project through the first node by using the device of processing data, and returning the operation of sending the business project to the second node through the first node by using the device of processing data,
wherein the office method further comprises:
reading to-be-processed data and a key through the first node by using the device of processing data, wherein the to-be-processed data comprises data received from a public network;
decoding, by using the device of processing the date, the to-be-processed data at the first node according to the key to obtain decrypted data; and
in a case of determining that the first node has no right to receive the decrypted data, sending the decrypted data to the second node by using the device of processing the date, so that the second node receives the decrypted data, wherein the office method further comprises:

acquiring original data and a key through the first node by using the device of processing the date, wherein the original data comprises data sent to a public network;

encoding, by using the device of processing data, the original data at the first node according to the key to obtain encrypted data; and in a case of determining that the first node has no right to send the encrypted data, sending the encrypted data to the second node by using the device of processing data, so that the second node sends the encrypted data.

17. An office device, comprising:

a camera configured to acquire image data;

a display configured to acquire text data, display an image result and display a text result;

an audio apparatus configured to acquire audio data and output an audio result; and the device of processing data according to claim 14 electrically connected to the camera, the display and the audio apparatus, wherein the device of processing data is configured to process the image data, the audio data and the text data to generate and transmit a second radio frequency signal, and receive and process the first radio frequency signal to output the image result, the audio result and the text result.

18. A non-transitory computer-readable storage medium having executable instructions stored thereon, wherein the instructions, when executed by a processor, are configured to cause the processor to implement the method according to claim 16.

* * * * *